United States Patent Office 2,797,224
Patented June 25, 1957

2,797,224

PROCESS FOR PREPARING PICOLYL SECONDARY AMINES

Hans-Albert Offe, Wuppertal-Elberfeld, Germany, assignor to Schenley Industries, Inc., New York, N. Y., a corporation of Delaware No Drawing. Application January 24, 1955, Serial No. 483,827

6 Claims. (Cl. 260—296)

This invention relates generally to improved methods for synthesis of organic chemical compounds and to products thereby obtained; more particularly, it is concerned with certain novel methods for producing picolyl secondary amines, especially such amines wherein the amino-nitrogen atom bears an aromatic substituent group in addition to the picolyl group, and with the novel substances thus produced.

Heretofore, secondary picolyl amines, which may be represented by the general formula:

$$C_5H_4N.CH_2.NHR$$

wherein R is an organic radical, have been obtained by reacting a suitably selected formyl-pyridine with a suitably selected primary amine of the formula $RNH_2$, R having the significance above-assigned, to produce a Schiff's base of the formula:

$$C_5H_4N.CH:NR$$

which, by action of suitable reagents, for example, lithium-aluminum hydride or catalytic hydrogenation, may be reduced to yield the desired secondary amine products.

This procedure of the prior art has several disadvantages: The formyl-pyridine starting materials are expensive; they are not generally commercially available, but, instead, must be prepared by synthetic routes that are difficult, that require use of costly starting materials, and that give unsatisfactory yields of the desired products in a form such that subsequent purification is very difficult; and they must be freshly prepared in each instance as, when stored under ordinary conditions, polymerization, condensation and other reactions take place as a result of the instability and reactivity of these compounds.

An object of this invention is to provide a method for producing picolyl secondary amines, and particularly picolyl secondary aromatic amines, avoiding use of formyl-pyridine starting materials.

Another object of this invention is to provide a novel method for making secondary amines of the type mentioned wherein the starting materials utilized are substances commonly available and/or readily synthesized from commonly available substances.

A further object of this invention is to provide a process for making picolyl secondary amines that produce the desired compounds in satisfactory yields and in a manner such that they can be recovered readily from the reaction mixture.

Other objects of this invention hereinafter will be apparent to those skilled in the art to which the invention relates.

In accordance with this invention, an acid-amine type reaction product, such as may be obtained by condensing an alpha or gamma dithionicotinic acid [pyridine-2(or-4)-carbodithionic acid] with a primary aromatic amine, is reductively desulfurized by reaction with hydrogen in statu nascendi, produced by displacement of hydrogen from an aqueous alkaline reaction medium by reaction with an amphoteric metal in elemental state, positioned higher than hydrogen in the electromotive displacement series and yielding a hydroxide soluble in the reaction medium. The picolyl secondary amine reaction product may be recovered from the reaction mixture by extraction, using a water-immiscible, liquid organic solvent.

According to the presently preferred embodiment of this invention, the hydrogen in statu nascendi is produced by interaction of aluminum or an aluminum alloy with an aqueous alkali-metal hydroxide solution. Especially preferred is the use of finely divided Raney nickel, which may be prepared by fusing together substantially equal parts by weight of aluminum and nickel, and then pulverizing the alloy. The Raney nickel, preferably, is used with aqueous solutions of potassium hydroxide when practicing the process of this invention.

The starting materials, i. e., the pyridine-2(or -4)-carbothionic acid amides, may be prepared according to known methods, for example, by reaction of the corresponding carbodithionic acid with the selected amine, substantially in the manner described in Chemische Berichte, 87, 825–834 (1954), or according to the process described in Chemische Berichte, 86, 208–213 (1953) when applied to alpha or gamma picoline, sulfur and the selected amine.

The product obtained by practice of the process of this invention, in certain instances, depending upon the starting materials employed, are new chemical compounds that may be useful in chemotherapy or that may be used as intermediates in production of compounds thus useful. For example, certain of these new compounds may be useful as solubilizing agents for chemotherapeutically active xanthine bases, such as theophylline; they may be administered to produce cardio-vascular effects in humans or other animals similar to those produced by sympathomimetic amines; or they may be reacted with suitable reagents, such as β-dimethylaminoethyl chloride, to produce compounds closely related to known histamine antagonists, anti-spasmodic agents and similar chemotherapeutically useful substances.

To facilitate a fuller and more complete understanding of the subject matter of this invention and how the process in accordance therewith may best be practiced, certain specific examples herewith follow wherein the preparation of three new chemical compounds is described. It is clearly to be understood that these examples are provided by way of illustration, merely, and are not to be construed as limiting, in any way, the invention here disclosed and claimed.

Example 1

About 64 parts by weight of pyridine-4-carbothionic acid anilide, which may be obtained by reacting pyridine-4-carbodithionic acid and aniline, is dissolved in approximately 200 parts by volume of warm 5N. potassium hydroxide solution, the proportions being about 64 grams of the former to 200 cubic centimeters of the latter. Approximately 60 parts by weight of powdered nickel-aluminum alloy is slowly added to the solution while stirring and, after reaction has ceased, the reaction product, the picolyl secondary amine of the formula:

$$p\text{-}C_5H_4N.CH_2.NH.C_6H_5$$

separates as droplets in the reaction mixture. The mixture is extracted with about 200 parts by volume of benzene, the benzene is removed by distillation, and the residue is crystallized from water. The product is thus obtained in the form of slightly yellowish crystals having a melting point of 102° C. and in a yield of about 63.5% of theoretical.

By reacting this product with β-dimethylaminoethyl chloride, a reaction product is obtained which may be represented by the formula:

p-C₅H₄N.CH₂.N(C₆H₅).CH₂CH₂N(CH₃)₂ which has a molecular structure characteristic of antihistaminic agents and is an isomer of the known antihistamine pyribenzamine [N,N-dimethyl-N'-benzyl-N'-(α-pyridyl)ethylenediamine].

*Example 2*

About 60 parts by weight of pyridine-4-carbothionic acid anisidide, which may be obtained by reacting pyridine-4-carbodithionic acid with p-anisidine, is dissolved in approximately 400 parts by volume of 5 N. potassium hydroxide solution and this solution is covered with about 400 parts by volume of benzene. While the temperature of the mixture is maintained at about 50° C., approximately 10 parts by weight of aluminum, in very finely divided condition, is added and, about one half hour after addition of the aluminum has been completed, the benzene layer is separated. The reaction mixture is washed with a further volume of benzene and this is combined with the separated benzene solution. The combined benzene extracts are washed with water, then evaporated and the residue is crystallized from methanol. The product, which is obtained in a yield of about 80% of the theoretical, is in the form of crystals, melting at 98° C., and it is represented by the formula:

p-C₅H₄N.CH₂HN(p-C₆H₄.OCH₃)

By reacting this product with β-dimethylaminoethyl chloride, a reaction product is obtained which may be represented by the formula:

p-C₅H₄N.CH₂.N(p-C₆H₄.OCH₃).CH₂CH₂N(CH₃)₂ which resembles, in its molecular structure, the antihistamines of the type represented by the product marketed under the tradename "Neo-Antergan" [N,N-dimethyl - N' - (p - methoxybenzyl) - N' - (α - pyridyl)-ethylenediamine], of which it is an isomer.

*Example 3*

Approximately 48 parts by weight of the product obtained by reacting pyridine-2-carbodithionic acid with α-aminopyridine is dissolved in about 300 parts by volume of 5 N. aqueous potassium hydroxide solution, the solution is covered with about 300 parts by volume of benzene, and approximately 7.5 parts by weight of finely divided aluminum is introduced and reacted in the manner described in the foregoing examples. The reaction product, obtained as a viscous oil in a yield of approximately 75% (30 parts by weight) and forming a picrate melting at 232° C., may be represented by the formula:

o-C₅H₄N.CH₂NH(o-C₅H₄N)

Having thus described the subject matter of this invention, what it is desired to secure by Letters Patent of the United States is:

1. Process for making picolyl secondary amines of the general formula:

C₅H₄N.CH₂NHR wherein R is an aromatic radical, that comprises reacting, in an aqueous alkaline reaction medium, an acid-amide type condensation product of a pyridinecarbodithionic acid and a primary amine of the formula RNH₂, R having the significance above-assigned, with hydrogen in statu nascendi, produced by displacement of hydrogen from the aqueous alkaline medium by action of a metallic substance chosen from the group consisting of aluminum and aluminum alloys, whereby said condensation product is reductively desulfurized; and recovering the desired secondary amine reaction product from the reaction mixture by extraction with a water-immiscible, liquid organic solvent.

2. Process as defined in claim 1 wherein the aromatic radical R is selected from the group consisting of phenyl, anisyl and pyridyl.

3. Process for making picolyl secondary amines of the general formula:

C₅H₄N.CH₂NHR wherein R is an aromatic radical selected from the group consisting of phenyl, anisyl, and pyridyl; that comprises reacting, in an aqueous, alkali-metal hydroxide reaction medium, and acid-amide type condensation product of a pyridinecarbodithionic acid and a primary amine of the formula RNH₂, R having the significance above-assigned; with hydrogen in statu nascendi, produced by displacement of hydrogen from the aqueous alkali-metal hydroxide reaction medium by action of aluminum thereon, whereby said condensation product is reductively desulfurized; and recovering the desired secondary amine reaction product from the reaction mixture by extraction with a water-imiscible, liquid organic solvent.

4. Process for making picolyl secondary amines of the general formula:

C₅H₄N.CH₂NHR wherein R is an aromatic radical selected from the group consisting of phenyl, anisyl, and pyridyl; that comprises reacting, in an aqueous potassium hydroxide reaction medium, an acid-amide type condensation product of a pyridinecarbodithionic acid and a primary amine of the formula RNH₂, R having the significance above-assigned; with hydrogen in statu nascendi, produced by displacement of hydrogen from the aqueous potassium hydroxide by action of aluminum in the form of an alloy with nickel thereon, whereby said condensation product is reductively desulfurized; and recovering the desired secondary amine reaction product from the reaction mixture by extraction with a water-immiscible, liquid organic solvent.

5. Process for making picolyl secondary amines of the general formula:

C₅H₄N.CH₂NHR wherein R is an aromatic radical selected from the group consisting of phenyl, anisyl, and pyridyl; that comprises reacting, in an aqueous potassium hydroxide reaction medium, an acid-amide type condensation product of pyridine-2-carbodithionic acid and a primary amine of the formula RNH₂, R having the significance above-assigned; with hydrogen in statu nascendi, produced by displacement of hydrogen from the aqueous potassium hydroxide by action of aluminum in the form of an alloy with nickel thereon, whereby said condensation product is reductively desulfurized; and recovering the desired secondary amine reaction product from the reaction mixture by extraction with a water-immiscible, liquid organic solvent.

6. Process for making picolyl secondary amines of the general formula:

C₅H₄N.CH₂NHR wherein R is an aromatic radical selected from the group consisting of phenyl, anisyl, and pyridyl; that comprises reacting, in an aqueous potassium hydroxide reaction medium, an acid-amide type condensation product of pyridine-4-carbodithionic acid and a primary amine of the formula RNH₂, R having the significance above-assigned; with hydrogen in statu nascendi, produced by displacement of hydrogen from the aqueous potassium hydroxide by action of aluminum in the form of an alloy with nickel thereon, whereby said condensation product is reductively desulfurized, and recovering the desired secondary amine reaction product from the reaction mixture by extraction with a water-immiscible, liquid organic solvent.

(References on following page)

References Cited in the file of this patent

UNITED STATES PATENTS 2,615,892    Clifford et al. _____ Oct. 28, 1952

FOREIGN PATENTS 503,962    Canada _____ June 29, 1954

OTHER REFERENCES

Papa et al.: Chem. Abst., vol. 37, col. 1407 (1943).
Papa et al.: Chem. Abst., vol. 37, col. 6213 (1943).
Fromherz et al.: Chem. Abst., vol. 42, col. 8957 (1948).